United States Patent [19]

Reinhart

[11] Patent Number: 4,889,402
[45] Date of Patent: Dec. 26, 1989

[54] ELECTRO-OPTIC POLARIZATION MODULATION IN MULTI-ELECTRODE WAVEGUIDES

[75] Inventor: Franz K. Reinhart, Summit, N.J.

[73] Assignee: American Telephone and Telegraph Company, AT&T Bell Laboratories, Murray Hill, N.J.

[21] Appl. No.: 342,712

[22] Filed: Apr. 21, 1989

Related U.S. Application Data

[63] Continuation of Ser. No. 239,076, Aug. 31, 1988, abandoned, which is a continuation of Ser. No. 110,067, Oct. 15, 1987, abandoned, which is a continuation of Ser. No. 455,670, Jan. 5, 1983, abandoned.

[51] Int. Cl.$^4$ .................................................. G02B 6/10
[52] U.S. Cl. ............................... 350/96.14; 350/96.12; 350/96.13
[58] Field of Search ............... 350/96.10, 96.11, 96.12, 350/96.13, 96.14, 96.15, 96.30

[56] References Cited

U.S. PATENT DOCUMENTS

| | | | |
|---|---|---|---|
| 3,645,603 | 2/1972 | Smith | 350/371 X |
| 4,082,419 | 4/1978 | Thompson et al. | 350/96.12 |
| 4,093,345 | 6/1978 | Logan et al. | 350/96.14 |
| 4,220,395 | 9/1980 | Wang et al. | 350/96.13 |
| 4,291,939 | 9/1981 | Giallorenzi et al. | 350/96.14 |
| 4,359,260 | 11/1982 | Reinhart et al. | 350/96.12 |
| 4,384,760 | 5/1983 | Alferness | 350/96.14 |
| 4,448,479 | 5/1984 | Alferness | 350/96.13 |
| 4,674,829 | 6/1987 | Bulmer et al. | 350/96.14 |
| 4,679,893 | 7/1987 | Ramer | 350/96.14 |
| 4,691,984 | 9/1987 | Thaniyavarn | 350/96.14 |
| 4,732,444 | 3/1988 | Papuchon et al. | 350/96.14 |
| 4,761,049 | 8/1988 | Burns et al. | 350/96.14 |
| 4,776,656 | 10/1988 | Sanford et al. | 350/96.14 |
| 4,820,009 | 4/1989 | Thaniyavarn | 350/96.13 |

OTHER PUBLICATIONS

Reinhart et al., "MOS Rib Waveguide Polarizers" applied Physics Lett., vol. 36, No. 4 2/80 pp. 237–240.
Reinhart et al., "Electrooptic Polarization . . . Waveguides" IEEE J. of Quant. Elect. vol. QE-18 No. 4 4/82 pp. 763–766.
Reinhart et al., "Densely Packed . . . Switches" Conf. on Int. and Guided optics, Salt Lake UT. (16-18 Jan. 1978) p. MD2-(1-4).
Reinhart et al., "Electrooptic Polarization . . . Waveguides" Conf. on optics, Pacific Grove CA. 6-8 Jan. 1982.
F. K. Reinhart et al, "MOS Rib Waveguide Polarizers," Applied Physics Letters, vol. 36, No. 4, Feb. 15, 1980, pp. 237–240.
J. C. Shelton et al, "Characteristics of Rib Waveguides in AlGaAs," *Journal of Applied Physics,* vol. 50, No. 11, Nov. 1979, pp. 6675–6687.
J. C. Shelton et al, "Rib Waveguide Switches With MOS Electrooptic Control for Monolithic Integrated Optics in GaAs-Al$_x$Ga$_{l-x}$ As," *Applied Optics,* vol. 17, No. 16, Aug. 15, 1978, pp. 2548–2555.
J. McKenna et al, "Double-Heterostructure GaAs-Al$_x$-Ga$_{1-x}$As [110] p-n Junction-diode Modulator," *Journal of Applied Physics,* vol. 47, No. 5, May 1976, pp. 2069–2078.

Primary Examiner—William L. Sikes
Assistant Examiner—Brian M. Healy
Attorney, Agent, or Firm—P. A. Businger; R. D. Laumann

[57] ABSTRACT

A rib waveguide polarization modulator is described that permits easy application to monolithic optical circuits. The device comprises a rib waveguide having two polarization modulation sections with a phasing section between the two modulation section. The phasing section adjusts the phase of the optical radiation in the waveguide before it enters the second modulation section.

6 Claims, 3 Drawing Sheets

ELECTRO-OPTIC POLARIZATION MODULATION IN MULTI-ELECTRODE WAVEGUIDES

This is a continuation of application Ser. No. 239,076 filed Aug. 31, 1988, now abandoned, which is a continuation of Ser. No. 110,067 filed Oct. 15, 1987, now abandoned, which is a continuation of application Ser. No. 455,670 filed Jan. 5, 1983, now abandoned.

TECHNICAL FIELD

This invention relates generally to electro-optic polarization devices and particularly to such devices that achieve polarization modulation in multi-electrode waveguides.

BACKGROUND OF THE INVENTION

There is much interest at the present time in the practical realization of monolithic optical circuits. Such circuits as presently contemplated for use in optical communications systems will not only have light sources and detectors but they will also have means of routing optical signals between the individual components on each chip as well as means of modulating the optical signals. The signals may be modulated in, for example, their intensity, amplitude, phase, or polarization. Monolithic optical circuits are of interest in optical communications as, for example, integrated optical repeaters. Such repeaters would permit optical signals to be detected, regenerated, and transmitted in a single integrated device.

The modulated output optical signal from such an integrated device may be obtained by directly modulating the light source in the monolithic optical circuit, i.e., internal modulation, or an external modulator may be used to modulate the light source. Both approaches to signal modulation are being explored at the present time. However, the latter approach, that is, the use of an external modulator, has the advantage that it theoretically promises to be more reliable at high data rates and permits the light source to be optimized solely for its optical output characteristics. Internal modulation often requires compromises being made in device design so that the device may be efficiently and reliably modulated directly.

As might be expected, many types of modulators have been developed. For example, *Journal of Applied Physics*, 47, pp. 2069–2078, May 1976, describes a (110) GaAs/$Al_xGa_{1-x}As$ p-n junction modulator. This modulator requires nearly degenerate TE and TM modes and this condition was satisfied in the devices described by having a small difference in the refractive index between the cladding and waveguide layers. However, the resulting planar guided modes were only weakly bound and it was therefore difficult to control the lateral guiding and the device capacitance because the initially relatively thick, approximately 2.0 $\mu$m, top cladding layer had to be etched to a relatively small thickness, i.e., approximately 0.3 $\mu$m, to provide the necessary lateral guiding. The thick cladding layer was necessary to prevent high TM mode losses through the metallic contacts.

Rib waveguide switches are described in *Applied Optics*, 17, pp. 2548–2555, Aug. 15, 1978, which have MOS electro-optic control. The switches had low losses and were capable of efficiently switching signals between optical channels. Other methods of control, for example, heterojunctions formed by a layer of CdO on the semiconductor, are also possible.

Rib waveguide polarizers are described in *Applied Physics Letters*, 36, pp. 237–240, Feb. 15, 1980. A metal cladding on top of a thin oxide layer provided differential absorption of the TE and TM modes in the waveguide resulting in polarization of the optical output. The polarizer provides efficient discrimination between TE and TM modes. Consequently, the integrated combination of polarizer devices with polarization modulators leads to direct intensity modulation of the light.

SUMMARY OF THE INVENTION

It has been found that a single mode rib waveguide polarization modulator having a measured extinction ratio of at least 27 db, a power conversion of approximately 0.99, and a switching voltage of 12.5 volts at a wavelength of 1.064 $\mu$m, may be obtained by using a multi-electrode configuration. The device comprises a rib waveguide and two modulator sections spaced from each other and means for adjusting the phase, i.e., phasing section, between the modulator sections. The modulator sections are spaced from each other by a distance sufficient to permit proper phase adjustment of the TE and TM modes in the phasing section before they enter the following modulator section. The drive and optical signals may be phase matched at the modulator sections permitting high speed operation. Complete polarization switching may be obtained. The modulator is integrable with polarizers, photodetectors, and light sources such as lasers.

DETAILED DESCRIPTION

It should be noted that for the purpose of clarity, the figures are not drawn to scale. Identical numerals in different figures indicate identical elements.

Figure 1:
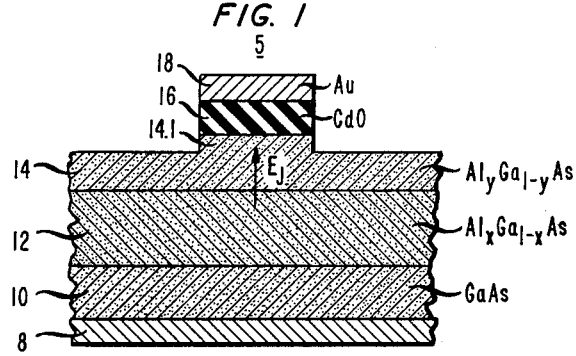
FIG. 1 is a sectional view of a rib waveguide polarization modulator of this invention.

A semiconductor rib waveguide polarization modulator device section 5 according to this invention is shown in a cross-sectional view in FIG. 1. The device depicted comprises a substrate 10, a first cladding layer 12, a second layer 14, a buffer layer 16, and a metal contact layer 18. The substrate is electrically contacted with contact 8. As can be seen, a portion of the second layer 14 forms a rib waveguide section which is indicated as 14.1. Layer 14 carries the light, which propagates in both TE and TM modes, and its optical dielectric constant should be higher than the optical dielectric constants of layers 12 and 16.

The device modulates the polarization using the phase difference between the eigenmodes and may be used at frequencies of, for example, 10 GHz.

In one embodiment, the first epitaxial layer comprised $Al_{0.2}Ga_{0.8}As$ doped to $3 \times 10^{16}/cm^3$ and the second epitaxial layer comprised $Al_{0.15}Ga_{0.85}As$ doped to less than $10^{16}/cm^3$. Both n-type epitaxial layers were grown on (110) oriented GaAs n+ doped, typically $10^{18}/cm^3$, substrates. Contact layer 8 comprised a gold/tin electrode to the GaAs substrate. The buffer layer comprised a highly conductive low optical loss, 0.19 $\mu$m thick, CdO layer and the electrode contact layer, approximately 0.2 $\mu$m thick, comprised Au. The CdO layer serves as a transparent heterojunction electrode that does not contribute significantly to the optical loss of the TE and TM modes. The gold overlay facilitated the formation of electrical contacts. Layers 12 and 14 were 3.8 and 1.1 $\mu$m thick, respectively. The height of the rib was approximately 0.12 $\mu$m, and this height, together with the lateral rib dimension of 3.0 $\mu$m, was chosen to form a low loss single mode rib waveguide. Light propagates along the rib, i.e., in a direction perpendicular to the plane of FIG. 1.

The structure may be grown by any conventional crystal growth technique such as liquid phase epitaxy or molecular beam epitaxy. After the semiconductor layers have been grown, the rib waveguides are formed by the well-known and now standard multiple anodization procedure. This procedure is described in detail in *Journal of Applied Physics*, 50, pp. 6675–6687, 1979. The buffer layer was formed by sputtering CdO to form the heterojunction barrier after the photoresist and anodized oxide were removed. The electrodes were formed by conventional photolithographic masking and etching to overlay the rib waveguide 14.1 and to define both the electrode lengths, $L_{mi}$, and the electrode spacings, $L_{pi}$, where the subscript i refers to the ith pair of electrode lengths and spacings. The devices were then lapped, provided with an electrical contact 8 to the substrate, and mounted on a modified integrated circuit holder and tested electrically and optically in well-known manner.

Figure 2:
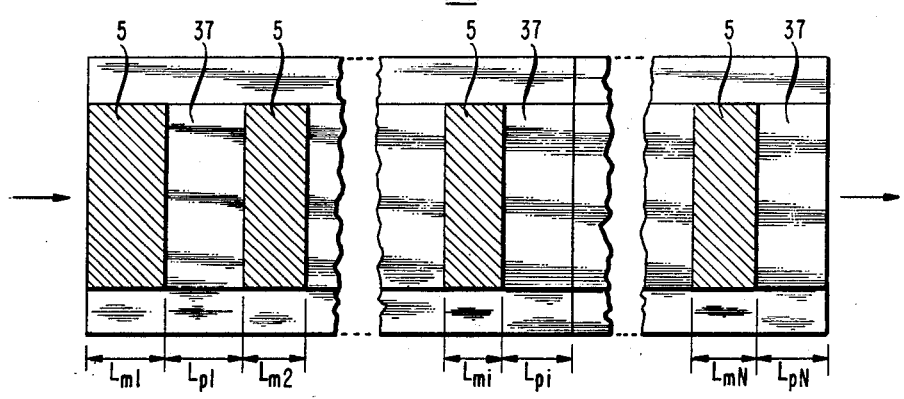
FIG. 2 is a top view of a polarization modulator according to this invention.

The electrodes formed by the CdO and gold overlay on the rib waveguides represent the active polarization modulator sections of length, $L_{mi}$, and are shown in a top view in FIG. 2. The polarization modulator sections 5, $L_{mi}$, which modulate the polarization of optical radiation in the rib waveguide are shown by the hatching and are spaced from each other by the spacing or phasing sections 37, $L_{pi}$, which are shown without hatching. The phasing sections, i.e., means to adjust the phase of optical radiation in the waveguide, may be either active or passive. Active phasing sections are generally preferred because of the practical difficulties involved in making passive sections that meet precise tolerances. Light propagates in the direction indicated by the arrow along the $[\bar{1}10]$ crystallographic direction. In the embodiment depicted, the length, $L_{mi}$, and spacing, $L_{pi}$, were 1.21 mm and 1.23 mm, respectively.

The mechanical stresses due to differences in the thermal expansion coefficients of the layers should be considered in designing the polarization modulator device. It was calculated that the modal phase difference between the TE and TM modes due to the strain birefringence was $-2.4$ rad/mm while the calculated modal phase difference including the CdO oxide layer and the Au contact layer, greater than about 0.2 $\mu$m, was about 4.0 rad/mm. The net modal phase difference, $\beta_{TE} - \beta_{TM}$ was 1.6 rad/mm, where $\beta_{TE}$, $_{TM}$ are the propagation constants of the TE and TM modes. However, this phase difference was quite sensitive to variations in the active layer thickness as well as fluctuations in the refractive index of the cladding and active layers, and its strain birefringence component also depends on the cladding layer thickness and the Al concentrations. The refractive index fluctuations may be caused by, for example, composition fluctuations of the Al concentration. Accordingly, the modal phase difference may be subject to sizeable fluctuations. This analysis indicates the practicality of fabricating nearly phase-matched polarization modulators and the desirability of having the modal phase differences adjustable to make up for processing variations.

Figure 3:
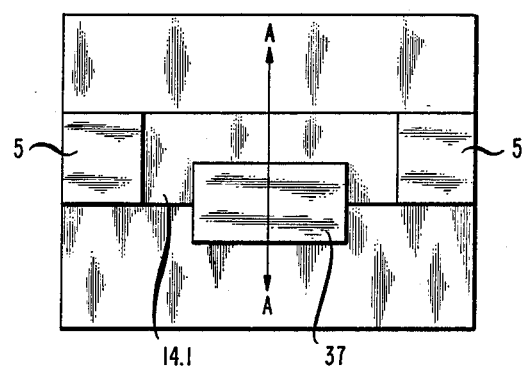
FIG. 3 is a top view of a segment of an embodiment of this invention containing a tunable phasing section.
Figure 4:
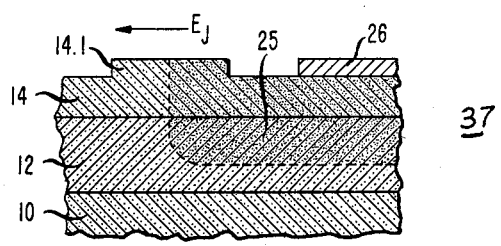
FIG. 4 is a cross-sectional view along line A—A of FIG. 3 of the tunable phasing section.

The fine tuning of the phase can be accomplished by phase modulation of the TE and/or TM modes in the phasing section 37 as is shown schematically in FIG. 3. This may be done in several ways. For example, the modal phase difference may be precisely adjusted by fine tuning the lengths of the polarizer section or by anodization or reactive ion etching of the phasing section, or a uniaxial pressure may be applied in that section. A uniaxial pressure could be applied in the phasing section by, for example, a suitable piezo-electric transducer. A preferred method is to apply an electric field along the crystallographic [001] direction. This may be done by diffusing a p-n junction as shown in FIG. 4 or having fringe field modulation by an offset electrode. FIG. 4 shows the phasing section 37 of FIG. 3 along line A—A. The p-type section is shown as 25 and the ohmic contact as 26. This arrangement permits dynamic tunability which can be advantageously used for the restoration of a particular light polarization from an arbitrary input polarization.

The polarization modulation is a direct result of the interference of the new eigenmodes that are created by the application of the junction electric field, i.e., the internal electric field of the heterojunction, $E_J$. In the modulator section 5, the direction of $E_J$ is along the [110] direction and the principal axes of the dielectric tensor lie along the $[1\bar{1}0]$ direction and in the $(1\bar{1}0)$ plane at angles of $\pm 45$ degrees to $E_J$. As discussed above, the polarization modulator generally shows a significant splitting of the unperturbed, i.e., for a zero junction field, TE and TM eigenmodes and a single electrode section 5 will thus generally achieve only limited switching. Full switching is obtained by separating the electrodes, that is, modulator sections by an amount sufficient to permit proper phase adjustment of the modes before they enter the next modulator section. The proper phase adjustment thus makes it possible to maintain the sense of polarization rotation in the electrode section 5. The complete polarization switching is then obtained by having sufficient number of sections that, of course, need not be identical. Other possibilities are less easily implemented. For example, sections could be introduced in which the sign of $E_J$ is reversed alternately. This does not appear possible with the planar electrode geometry on (110) substrates described in FIGS. 1 and 2, but it is feasible on a (001) oriented substrate by using the configuration of FIG. 4 where $E_J$ is oriented along the $\pm[\bar{1}10]$ or $\pm[110]$ crystallographic directions. From this it is apparent to those skilled in the art that still other crystallographic orientations may be used.

The full switching may be better understood by using a matrix analysis in which the input and output electromagnetic fields, $E_{in}$ and $E_{out}$, respectively, are related by the equation:

$$E_{out} = AE_{in} \quad (1)$$

where A is the 2×2 field transmission matrix of the device. The matrix A for the entire device is the product of the individual matrixes of each section which are, for the ith section:

$$A = \begin{pmatrix} \exp(-i\phi) & 0 \\ 0 & \exp(i\phi) \end{pmatrix} \cdot \begin{pmatrix} a & b \\ b & a^* \end{pmatrix} \exp(-i\theta) \quad (2)$$

where $$\phi = (\tfrac{1}{2})(\beta_{TE} - \beta_{TM}) L_p, \quad (3)$$

and $$\theta = (\tfrac{1}{2})[(\beta_{TE} + \beta_{TM}) L_m + (\beta_{TE} + \beta_{TM}) L_p]. \quad (4)$$

The first matrix in equation (2) represents the phasing section and the second matrix in equation (2) represents the electrode, i.e., polarization modulator, section. The subscripts indicating the ith section have been omitted.

The following equations define a and b:

$$a = \cos\psi - i\frac{r}{\sqrt{1+r^2}} \sin\psi \quad (5)$$

$$b = -i\frac{\sin\psi}{\sqrt{1+r^2}}$$

where $$\psi^2 = \phi_m^2 + (KL_m)^2, \quad (6)$$

and $$r = \phi_m/KL_m, \quad (7)$$

where $\phi_m = \tfrac{1}{2}(\beta_{TE} - \beta_{TM})L_m$ for $E_J = 0$, and $KL_m$ is the electro-optically induced phase difference in the degenerate case. With the average junction electric field in the section being parallel to the crystallographic (110)-direction:

$$2K = \Gamma(2\pi/\lambda)n^3 r_{41}\overline{E}_J, \quad (8)$$

where $r_{41} \approx -1.4 \times 10^{-10}$ cm/V is the linear electro-optic coefficient; $n \approx 3.402$ is the index of refraction of the waveguide layer; and $\Gamma$ is the overlap of the junction electric field with the optical electric field. The common phase factor may be neglected since only the TE and Tm modes are of interest and the ideal through (|) state is $$A_{||} = \begin{pmatrix} 1 & 0 \\ 0 & 1 \end{pmatrix},$$

and the ideal crossed state (X) is $$A_X = \begin{pmatrix} 0 & i \\ i & 0 \end{pmatrix}.$$

In the case of identical sections, it is easy to design devices that achieve perfect switching which is always obtained by switching from $\overline{E}_J = 0$ to $\overline{E}_J \leq \overline{E}_{Jmax}$. $\overline{E}_{Jmax}$ is given by either the maximum field permitted in terms of the maximum acceptable switching energy or the maximum field that the device may sustain without adversely altering device performance. It is readily observed that ideal switching is always possible with $2\phi_p = \pi$ and $r^* = \cot g(\pi/2N) = \phi_{m\ max}/K_{max}L_m$ as given in Table I for up to five identical sections. Also shown in Table I is the ratio $(L_m/L_p)_{min} = r^*/\sqrt{1+r^{*2}}$ and $2\phi_{m\ max}$ for an assumed $2K_{max}L_m = \pi$ that is easily reached with $\overline{E}_J = 15$ V/μm and a length $L_m \approx 1$ mm.

TABLE I

| N | r* | $(L_m/L_p)_{min}$ | $2\phi_{m\ max}$ |
|---|---|---|---|
| 1 | 0 | indefinite | 0 |
| 2 | 1 | 0.7071 | $\pi$ |
| 3 | $\sqrt{3}$ | 0.8660 | 5.4414 |
| 4 | $1 + \sqrt{2}$ | 0.9239 | 7.5845 |
| 5 | $\sqrt{5 + \sqrt{20}}$ | 0.9511 | 9.6688 |

Figure 5:
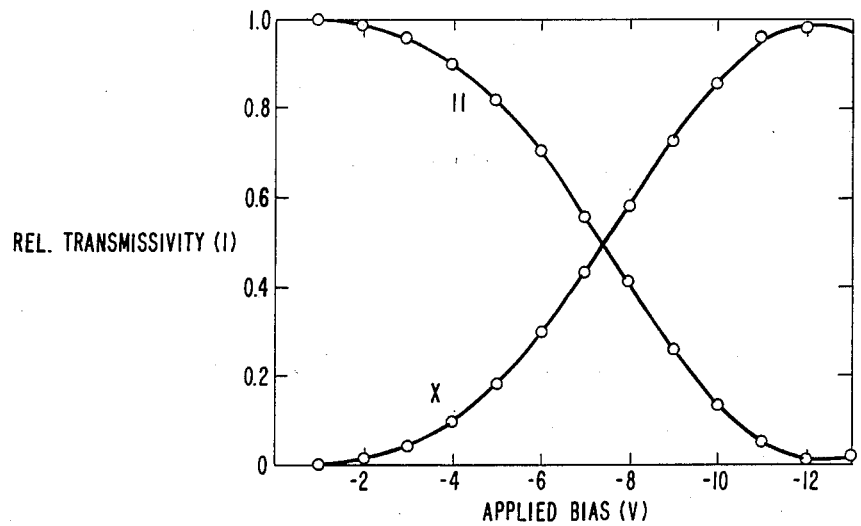
FIG. 5 plots the relative transmissivity vertically as a function of applied voltage horizontally for a two-section modulator.

FIG. 5 shows the relative transmissivity plotted vertically as a function of applied voltage plotted horizontally for a two-section modulator. The two curves represent the parallel and crossed analyzer cases as shown in the Figure. The modulator and phasing sections were 1.21 mm and 1.23 mm long, respectively. For both states, the energy exchange ratio, F, was greater than or equal to 0.98 and the applied voltage was approximately $-12.5$ volts. For dissimilar electrode voltages, $-11.3$ volts and $-12.4$ volts, respectively, F was approximately 0.99 which resulted in a substantially better extinction ratio when switching from the parallel to the cross state. Switching from the cross state to the parallel state resulted in an extinction ratio in excess of 27 db. This shows that even an imperfect design can yield excellent performance which is similar to the near degenerate case. The results described are consistent with a uniform phase difference $\beta_{TE} - \beta_{TM}$ of approximately 2 rad/mm over the phase and modulator sections. A slight adjustment of this value should result in a perfect modulation for the fabricated $L_M/L_P$ ratio.

Figure 6:
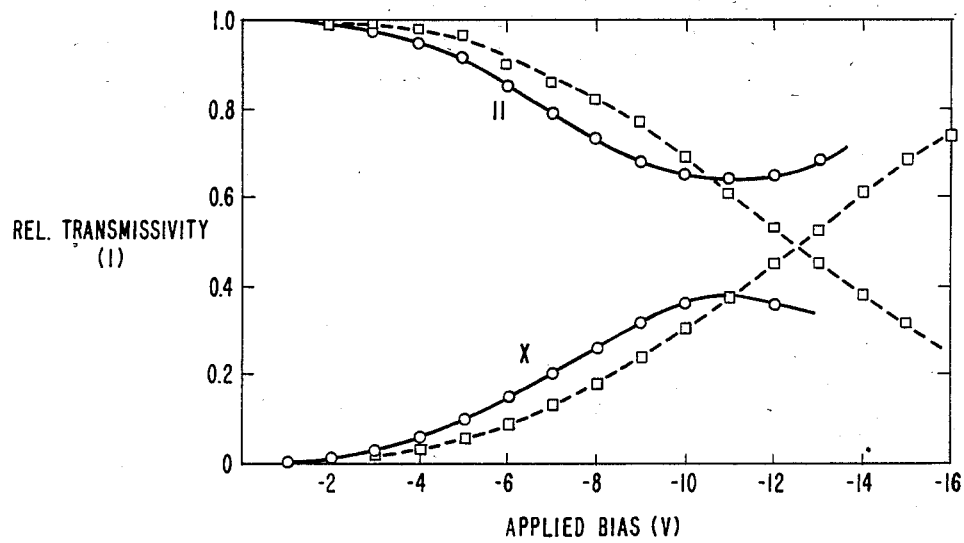
FIG. 6 plots the relative transmissivity vertically as a function of applied voltage horizontally for an improperly designed phase section.

Tests on individual modulator sections resulted in a sizeable polarization modulation and no measurable additional loss due to the electrodes. The energy exchange ratio is varied from rib waveguide to rib waveguide and thus indicated sizeable variations of the phase mismatch as discussed above. FIG. 6 plots the relative transmissivity vertically as a function of the applied voltage for an incorrectly designed phase section. The results of both the parallel and cross states are shown. The dashed line represents the smooth fit through one electrode data which are given by the squares and the two electrode data which are indicated by the circles were taken with identical voltages. One of the electrodes was identical to the one that produced the square data points. In the data shown, it is estimated that the phase mismatch for this waveguide was 0.68 rad/mm under the assumption of the uniform phase mismatch and the phasing in modulator sections. This shows the importance of phasing section which is clearly not correct for this embodiment.

Another embodiment such as FIG. 3 which represents a polarization modulation and/or restoration device has the disadvantage of excess stored energy to execute phase modulation because of the poor overlap of the field in the modulation section. This, in turn, leads to excess capacitance and thus permits only relatively slow modulation rates of the phasing sections. As shown in FIG. 4, only a small segment of the p-n junction, represented by the dashed line, intersects with waveguide 14.1 and thus overlaps the optical field. It should be stressed, however, that only the polarization restoration mode of operation is slow. Very fast polarization modulation is possible with modulation sections 5 only, and by phase matching the electrical drive signal to the optical signal as it passes under the modulator sections 5.

Figure 7:
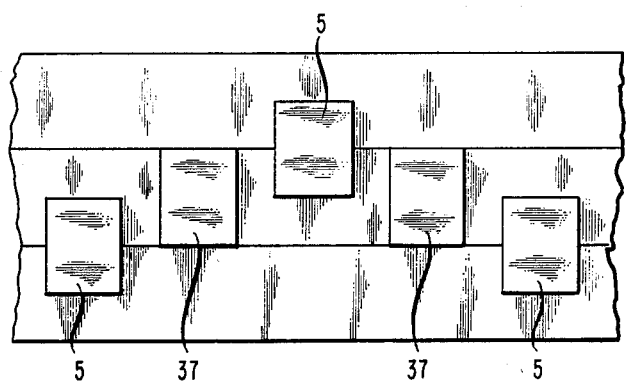
FIG. 7 is a top view of another embodiment of this invention.

For fast modulation, other embodiments are contemplated using different and usually preferred substrate orientations such as (111) or (100). An embodiment capable of very fast modulation is depicted in a top view in FIG. 7. The device comprises those elements shown in FIGS. 1 and 2, namely, a waveguide 14.1 and modulator and phasing sections 5 and 37, respectively, formed on Group III-V layers. For (100) substrate orientations, the [0$\bar{1}$1] and [011] crystal directions are parallel to and perpendicular to the rib waveguide 14.1, respectively. For (111) substrate orientation, the rib waveguide lies along a (2$\bar{1}\bar{1}$) direction and the field along a [01$\bar{1}$] direction. Polarization modulation sections 5 are as in FIG. 4 and phasing sections 37 have cross sections as shown in FIG. 1. Depending on the size of $\beta_{TE} - \beta_{TM}$, one or a multiplicity of sections as depicted in FIG. 7 can serve to achieve full modulation by merely changing the phases of the phasing sections. The length of the phasing section 37 has to be sufficient to allow a phase modulation $>\pi$ over a basic phase difference of approximately $2\pi q$ where $\underline{q}$ is a positive integer.

The high speed is achieved by merely adjusting the phase modulation sections 37 where optimum phase modulation is guaranteed by the excellent overlap between the optical and modulating fields and/or by phase matching of the electrical drive signal to the optical signal as it passes the section 37.

Figure 8:
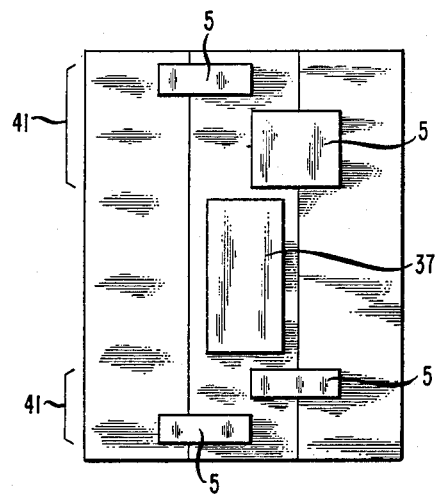
FIG. 8 is a top view of yet another embodiment of this invention.

Another embodiment, suitable for fast modulation, is depicted in top view in FIG. 8. This embodiment is a polarization interferometer. A first set 41 of sections 5, only two of which are shown, provide enough polarization modulation to achieve exactly identical amounts of TE and TM modes, i.e., a 3 db polarization divider. The phase section will be followed by another 3 db polarization divider 41. Depending on the phase of the phase section, the output polarization can be easily changed from TE to TM or vice versa. Depending on the length of the phasing section 37, phase matching of the electrical drive signal to the optical signal may be employed. To this end, section 37 may be split up advantageously into suitable short segments.

Other materials can, of course, be used. For example, other Group III-V or Group II-VI binary, ternary, or quaternary compound semiconductors may be used. Most Group III-V compound semiconductors belong to the same crystal point group, namely ($\bar{4}$3m), and will have the same nonzero linear electro-optic coefficient. The buffer layer may comprise other low refractive index-conducting materials such as indium oxide.

Other crystallographic substrate orientations may also be used which necessitate different electrode configurations.

What is claimed is:

1. An optical device comprising
   a substrate-supported waveguide, said waveguide consisting essentially of an electro-optic material in a waveguiding structure having a preferred direction of light propagation,
   first and second electrodes disposed at least in part on said waveguide and spaced apart in said direction, the space between said electrodes comprising means for adjusting the phase of optical radiation in said waveguide, and
   an electrical signal source connected to said electrodes such that the same signal is applied to said first and second electrodes.

2. An optical device as recited in claim 1 in which said phasing means is tunable.

3. An optical device as recited in claim 1 in which said waveguide is supported by a Group III-V compound semiconductor substrate.

4. An optical device as recited in claim 3 in which said substrate is oriented along the (100), (110), or (111) crystal directions.

5. An optical device as recited in claim 1 in which said electro-optic material is selected from the group consisting of Group III-V and Group II-VI semiconductor compounds.

6. An optical device as recited in claim 5 in which said electro-optic material comprises $Al_xGa_{1-x}As$, x being greater than or equal to 0.0 and less than or equal to 1.0.

* * * * *